INVENTOR
DONALD L. BENTSEN
BY
ATTORNEY

April 11, 1967  D. L. BENTSEN  3,313,434
TILT BOX FOR HAULING AND DISPENSING FLOWABLE MATERIAL
Filed Feb. 25, 1965  2 Sheets-Sheet 2
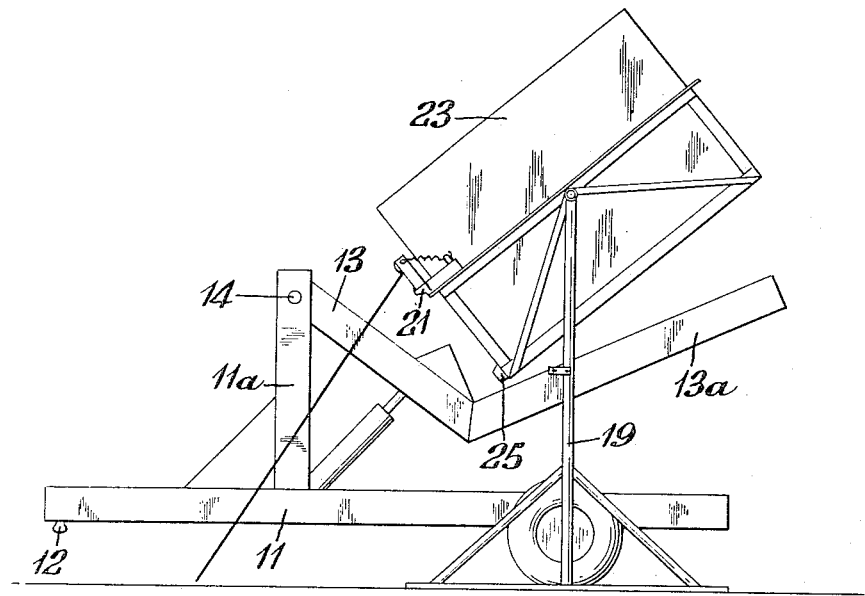
*Fig. 3.*
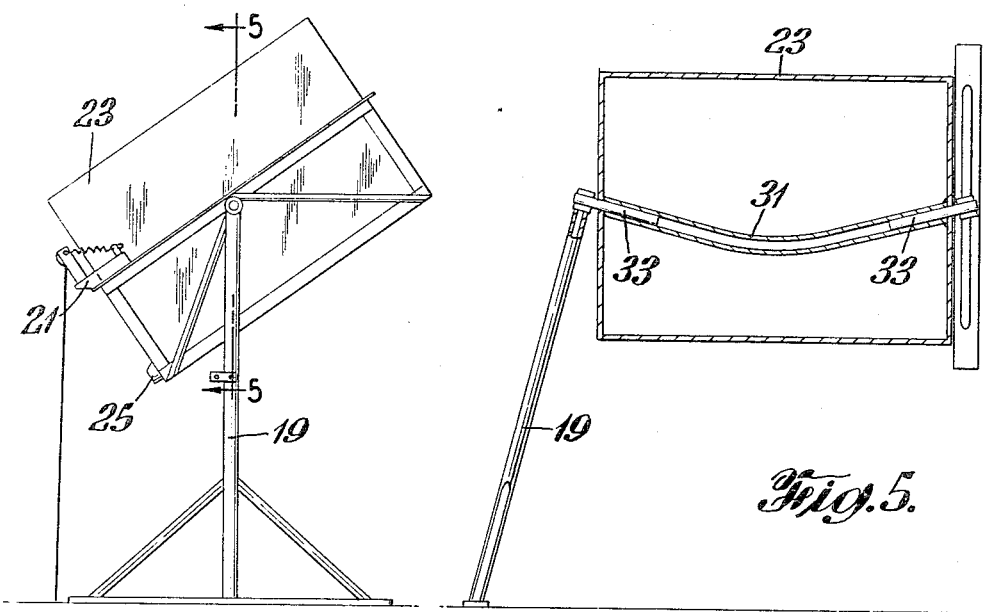
*Fig. 4.*  *Fig. 5.*
INVENTOR
DONALD L. BENTSEN
BY
ATTORNEY

United States Patent Office 3,313,434
Patented Apr. 11, 1967

3,313,434
TILT BOX FOR HAULING AND DISPENSING
FLOWABLE MATERIAL
Donald L. Bentsen, McAllen, Tex., assignor to Union
Carbide Corporation, a corporation of New York
Filed Feb. 25, 1965, Ser. No. 435,304
4 Claims. (Cl. 214—501)

This invention relates to means for hauling and dispensing flowable material and is particularly adapted to the handling of flowable material which is to be dispensed gradually at the site of use. More specifically the invention is directed to flowable material dispensing means, severable from the hauling means and capable of providing a continuous or intermittent supply of cargo at the application site.

The invention finds exceptionally advantageous use in handling agricultural chemicals, e.g., fertilizers or insecticides and other pesticides, in areas where large amounts of agricultural chemicals must be supplied and dispensed during a relatively short season. My invention provides means for leaving a gravity-emptying material supply at the site of application without tieup of hauling equipment. In this respect the invention obviates the disadvantages inherent in conventional agricultural chemical application equiupment, e.g., tank trucks, where large and expensive machinery must be left at the application site during the entire time of application of the chemical. At the same time, my invention provides a cargo box having a low center of gravity when in a traveling position to result in a safely and efficiently hauled apparatus.

Essentially, the apparatus of this invention comprises a vehicle, such as a truck or trailer, and a detachable cargo box, the vehicle being equipped with jack means activating a bent tilting frame to raise and tilt the cargo box to an appropriate feed position and the cargo box being fitted with legs which swing downward into a vertical position when the box is in a raised poistion. The box is then capable of resting on its own legs and the vehicle can be removed after the box-raising means have been lowered. The bent tilting frame is rotated through a fulcrum above the carrying surface of the vehicle body to result in simultaneous raising and tilting of the cargo box resting thereon.

The present invention presents numerous advantages over known portable hopper arrangements while at the same time being of simpler construction and capable of rapid and extremely convenient operation. For example, U.S. Patent 2,233,005 to Garlinghouse discloses a cement hopper which is detachably mounted on a dump truck and is self-supporting in a tilted position. Garlinghouse's apparatus is not suitable for agricultural chemicals dispensing purposes, however, because the feed spout is too low for supplying agricultural application rigs. The raised fulcrum of the present invention, on the other hand, makes it possible to elevate the feed spout as the cargo box is being raised. In addition, in the present invention a single leg support on both sides of the cargo box is mounted at a point intermediate the lateral extremities of the box whereas the pivoted leg of Garlinghouse is mounted at the uppermost corner, thereby requiring assembly of four separate leg and bracing members to form a self-supporting hopper. In the present invention release of one latch is all that is required to form a rigid assembly as will be more fully described hereinafter.

A better understanding of the invention, as well as an illustration of a preferred embodiment thereof, can be had by reference to the appended drawings wherein:

FIGURE 3 shows the cargo box of FIGURE 2 in a self-supported raised position while the vehicle raising means have been partially lowered.

FIGURE 4 shows the free-standing self-supporting cargo-box in its tilted feed position; and FIGURE 5 shows bent sleeve means within the cargo box of FIGURE 4 which causes the legs of the box to be displaced to clear the vehicle wheels as they are lowered with the cargo box in a raised position.

Figure 1:
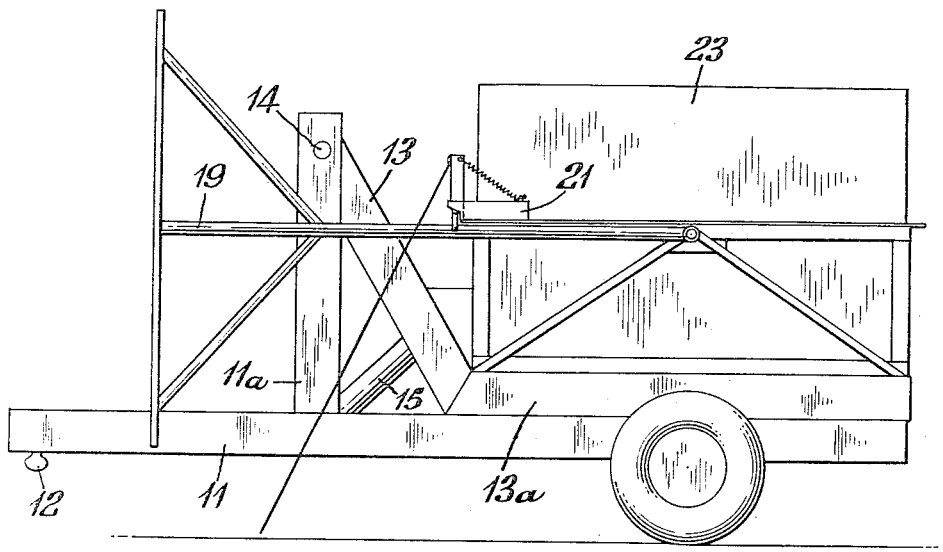
FIGURE 1 is a side view of an assembly with the cargo box in a lowered traveling position.

With particular reference to FIGURE 1, vehicle body 11 drawn by tractor or truck through hitch 12, supports tilting frame 13, having a normally horizontal portion 13a and an inclined portion whose fulcrum 14 is elevated above the carrying surface of vehicle body 11 by vertical support pillars, 11a. The tilting frame 13 is raised by jack 15 to a poistion where member 13a is displaced from a horizontal position to make roughly a 50° angle with the horizontal in the position of maximum elevation.

Figure 2:
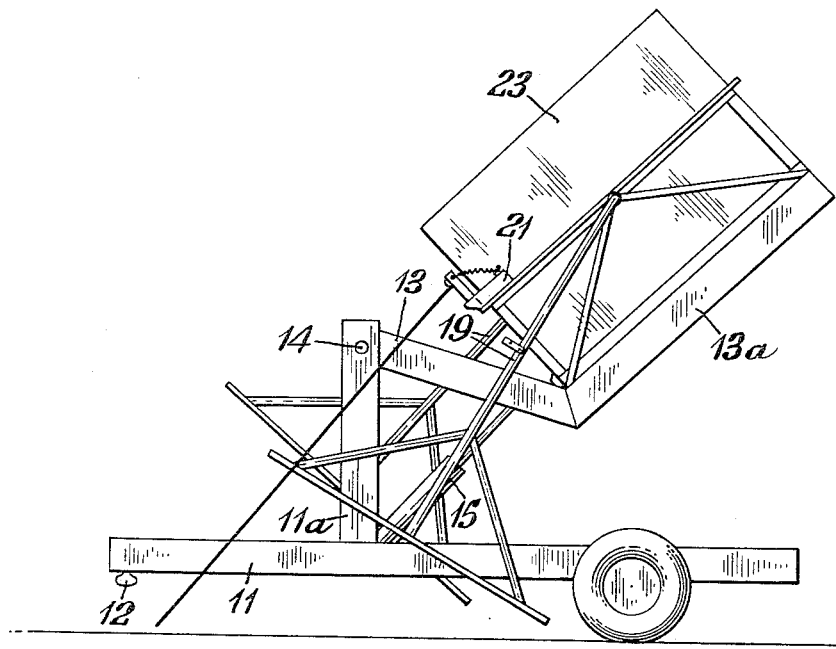
FIGURE 2 is a side view of the assembly of FIGURE 1 with the cargo box in a raised position.

In FIGURE 2 the tilting frame has been raised and latch 21 holding leg support 19 has been released allowing the leg to swing to a vertical position. In practice the box will have to be lifted to a point slightly higher than its permanent self-supporting raised position to allow the legs to swing downward to a substantially vertical position. The box is then gently lowered until its weight rests completely on leg supports 19 whereafter tilting frame 13 can be lowered rapidly through an intermediate position as shown in FIGURE 3, to the level carrying position. After the support vehicle has been withdrawn completely, the cargo box supported by legs 19 constitutes a gravity-emptying material supply with the feed spout 25 in a position sufficiently elevated for dispensing of material into an airplane or ground field application rig. The free standing self-supporting box is shown in FIGURE 4. It will be noted that the cargo box is front-feeding in that it discharges flowable material through spout 25 so that the assembly shown in FIGURE 1 can be backed into tight dispensing sites and still permit easy access to the feed spout. In prior art devices, the rear-feeding characteristic necessitates a relatively open use site.

A particularly advantageous feature of my invention is that leg supports 19 are displaced outwardly from the cargo box 23 as they swing down so that they clear the wheels of the supporting vehicle. In the traveling position the legs 19 fit snugly against the sides of the cargon box to result in maximum box width within highway regulations limiting the overall width of the vehicle. This feature is achieved by the construction shown in FIGURE 5 comprising a bent sleeve member 31 in which the leg supports are mounted to displace the plane of leg rotation sufficiently from the vertical to achieve the desired clearance. The sleeve 31 is bent downward so that the legs 19 when in their vertical position will also be at the position of maximum displacement from the vehicle wheels; while the legs are in the horizontal traveling position they will fit snugly against the box 23. In FIGURE 5 leg 19a has been swung down to a displaced position while independently mounted leg 19b is in the traveling position. It should be noted that when box 23 is firmly self-supported on its legs the mounting pins 33 lie in a plane which defines the position of sleeve 31 which in turn is securely affixed to cargo box 23 to also define the position of cargo box 23. Consequently, the cargo box when resting on its legs 19 will be maintained in the appropriate tilt position without the need for external braces although such can, of course, be used for added rigidity.

The construction of the cargo box itself will be readily apparent to the skilled artisan. While the embodiment shown in the appended drawings has rectangular sides it will be understood that my invention is not limited thereto. The provision for loading the boxes may also vary and may consist of, for example, a slidable or detachable top. While the flowable materials capable of being handled by the present equipment may be pulverulent or granular materials, slurries, solutions and other liquids may be handled, appropriate provision being made in the construction of the cargo box.

Many other modifications and alternative embodiments of the invention will be apparent to those skilled in the art without departure from the spirit and scope of this invention, it being understood that the foregoing disclosure has been given by way of example for clearness and understanding only and no unnecessary limitations should be implied therefrom.

What is claimed is:

1. Apparatus for hauling and dispensing flowable material comprising in combination, a vehicle body having a carrying surface and a support vertically elevated with respect to said carrying surface, a tilting frame pivotally mounted on said support and extending lengthwise of the vehicle body and capable of being simultaneously elevated and tilted on an axis transverse to the length of the vehicle body and above the carrying surface by jack means mounted on said vehicle body, a cargo box detachably mounted on said tilting frame, said cargo box having two rigid leg supports swingably mounted on the sides of the box intermediate the lateral extremities thereof and free to drop to a vertical position, said leg supports when in a vertical position being long enough to maintain the cargo box in an elevated position to permit withdrawal of the vehicle body with the tilting frame in a lowered position, and said box being capable of standing by itself supported only by said leg supports in a tilted position to act as a gravity-emptying supply of flowable material.

2. Apparatus as claimed in claim 1 wherein the said leg supports are mounted on said cargo box to swing in a plane of rotation which deviates from the vertical sufficiently to result in sung fit of the leg supports against the cargo box when the leg supports are in a substantially horizontal traveling position but to cause the leg supports to clear the vehicle wheels which extend beyond the width of the cargo box as they swing into a vertical position to support the raised cargo box.

3. Apparatus as claimed in claim 2 wherein said leg supports are mounted in a bent sleeve transversely disposed within the cargo box and extending from one side thereof to the other, said sleeve being bent downwardly so that the end portions thereof contacting the sides of the box point upwardly.

4. Apparatus as claimed in claim 1 wherein the said two rigid leg supports are swingably mounted on the sides of said cargo box at a point substantially equidistant from the lateral extremities thereof.

References Cited by the Examiner

UNITED STATES PATENTS

| 2,233,005 | 2/1941 | Garlinghouse | 214—515 |
| 2,606,676 | 8/1952 | Dempster | 214—515 |

FOREIGN PATENTS 704,550  2/1954  Great Britain.

GERALD M. FORLENZA, *Primary Examiner.*

ALBERT J. MAKAY, *Examiner.*